(12) United States Patent
Mihara et al.

(10) Patent No.: US 11,580,712 B2
(45) Date of Patent: Feb. 14, 2023

(54) INFORMATION PROCESSING APPARATUS, SYSTEM, AND METHOD FOR DETECTING COLLISION BETWEEN A PHYSICAL AND VIRTUAL OBJECT

(71) Applicant: CANON KABUSHIKI KAISHA, Tokyo (JP)

(72) Inventors: Akinao Mihara, Kawasaki (JP); Yasumi Tanaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/789,895

(22) Filed: Feb. 13, 2020

(65) Prior Publication Data

US 2020/0184736 A1    Jun. 11, 2020

Related U.S. Application Data

(63) Continuation of application No. PCT/JP2018/029152, filed on Aug. 3, 2018.

(30) Foreign Application Priority Data

Aug. 22, 2017 (JP) .............................. JP2017-159101

(51) Int. Cl.
*G06T 19/20* (2011.01)
*G06F 3/01* (2006.01)
*G06T 19/00* (2011.01)

(52) U.S. Cl.
CPC .............. *G06T 19/20* (2013.01); *G06F 3/011* (2013.01); *G06T 19/006* (2013.01); *G06T 2210/21* (2013.01); *G06T 2219/2004* (2013.01)

(58) Field of Classification Search
CPC ....... G06T 19/00; G06T 19/006; G06T 19/20; G06T 2210/21; G06T 2219/2004;
(Continued)

(56) References Cited

U.S. PATENT DOCUMENTS 8,230,367 B2 * 7/2012 Bell ......................... G06F 3/017
715/863
8,866,811 B2 * 10/2014 Okuno .................. G06T 19/006
345/421

(Continued)

FOREIGN PATENT DOCUMENTS

EP        3342326 A1    7/2018
JP     2017-033299 A    2/2017
(Continued)

*Primary Examiner* — Jennifer Mehmood
*Assistant Examiner* — Donna J. Ricks
(74) *Attorney, Agent, or Firm* — Canon U.S.A., Inc. IP Division (57) ABSTRACT

An information processing apparatus creates a first virtual object expressing a physical object that is detected from physical object information obtained from a physical object information acquisition unit. The information processing apparatus determines a display state of the first virtual object in accordance with a result of detecting collision between the first virtual object and a second virtual object. The information processing apparatus creates, on the basis of a virtual space including the first virtual object and the second virtual object, position-orientation of an HMD, the determined display state, and a physical space image obtained from the HMD, a mixed reality image in combination of an image of the virtual space and the physical space image, and displays the created mixed reality image on the HMD.

10 Claims, 4 Drawing Sheets

(58) Field of Classification Search
CPC . G06T 2207/30244; G06T 7/70; G06T 15/20; G06F 3/011; G06F 3/01
See application file for complete search history.

(56) References Cited

U.S. PATENT DOCUMENTS

| | | | |
|---|---|---|---|
| 9,202,313 B2* | 12/2015 | Bennet | G06F 3/04815 |
| 2005/0231532 A1* | 10/2005 | Suzuki | G06F 3/0338 |
| | | | 345/633 |
| 2014/0235311 A1* | 8/2014 | Weising | G06T 7/70 |
| | | | 463/14 |
| 2016/0054837 A1 | 2/2016 | Stafford | |
| 2016/0239080 A1* | 8/2016 | Margolina | G06F 1/163 |
| 2017/0038830 A1* | 2/2017 | Clement | A63F 13/212 |
| 2018/0350150 A1* | 12/2018 | Powderly | G02B 27/017 |
| 2020/0019232 A1* | 1/2020 | Rouvinez | G06T 19/006 |
| 2020/0066058 A1* | 2/2020 | Lyren | G06F 3/012 |

FOREIGN PATENT DOCUMENTS

| | | |
|---|---|---|
| JP | 2017-142785 A | 8/2017 |
| WO | 2017/038241 A1 | 3/2017 |

\* cited by examiner

INFORMATION PROCESSING APPARATUS, SYSTEM, AND METHOD FOR DETECTING COLLISION BETWEEN A PHYSICAL AND VIRTUAL OBJECT

CROSS-REFERENCE TO RELATED APPLICATIONS

This application is a Continuation of International Patent Application No. PCT/JP2018/029152, filed Aug. 3, 2018, which claims the benefit of Japanese Patent Application No. 2017-159101, filed Aug. 22, 2017, both of which are hereby incorporated by reference herein in their entirety.

TECHNICAL FIELD

The present invention relates to an information processing apparatus detecting collision between a physical object in a physical space (hereinafter simply referred to as a "physical object") and a virtual object in a virtual space (hereinafter simply referred to as a "virtual object").

BACKGROUND ART

Research of an MR (Mixed Reality) system is actively conducted aiming to realize seamless connection between a physical space and a virtual space. In the MR system, an HMD (Head Mount Display), for example, is often used as a display device. The MR system is utilized in industrial fields as well, for example, to implement a real simulation without fabricating a prototype. For example, a layout in a factory can be simulated by superimposing a virtual space of the factory on a physical space. On that occasion, in order to perform a simulation such as regarding whether a hand can reach a virtual object in the virtual space when the virtual object is placed somewhere in the factor, it is needed to detect collision between the hand as a physical object and the virtual object.

When, in a mixed reality space in combination of a physical space and a virtual space, collision between physical objects or between a physical object and a virtual object is presented to a user, how both the objects collide with each other needs to be visualized. In some cases, however, the visualization makes the physical object not recognizable by the user. To cope with such a problem, Japanese Patent Laid-Open No. 2017-033299 discloses a technique of, when virtual objects collide with each other, leaving a collision trace to clearly indicate the collision.

However, the technique disclosed in Japanese Patent Laid-Open No. 2017-033299 is targeted for the collision between the virtual objects, and it does not discuss a point of presenting, to the user, the collision between the physical objects or between the physical object and the virtual object. A main object of the present invention is to provide an information processing apparatus presenting, to the user, the collision between the physical objects or between the physical object and the virtual object.

SUMMARY OF INVENTION

The present invention provides an information processing apparatus including captured image acquisition means obtaining, on the basis of an image pickup device, a physical space image that is an image of a physical space, position-orientation information acquisition means obtaining position-orientation information that represents position-orientation of a viewpoint of the image pickup device, virtual object creation means detecting a physical object in the physical space and creating a first virtual object that expresses the detected physical object, collision detection means detecting collision between the first virtual object and a second virtual object, determination means determining a display state of the first virtual object in accordance with a detection result of the collision detection means, mixed reality image creation means creating, on the basis of a virtual space including the first virtual object and the second virtual object, the position-orientation information, the display state, and the physical space image, a mixed reality image in combination of an image of the virtual space and the physical space image, and image output means outputting the created mixed reality image to be displayed on a predetermined display device.

Further features of the present invention will become apparent from the following description of exemplary embodiments with reference to the attached drawings.

DESCRIPTION OF EMBODIMENTS

An embodiment will be described in detail below with reference to the drawings. The following embodiment discloses an example of practically implementing the present invention and represents a practical example of the features stated in Claims.

System Configuration

Figure 1:
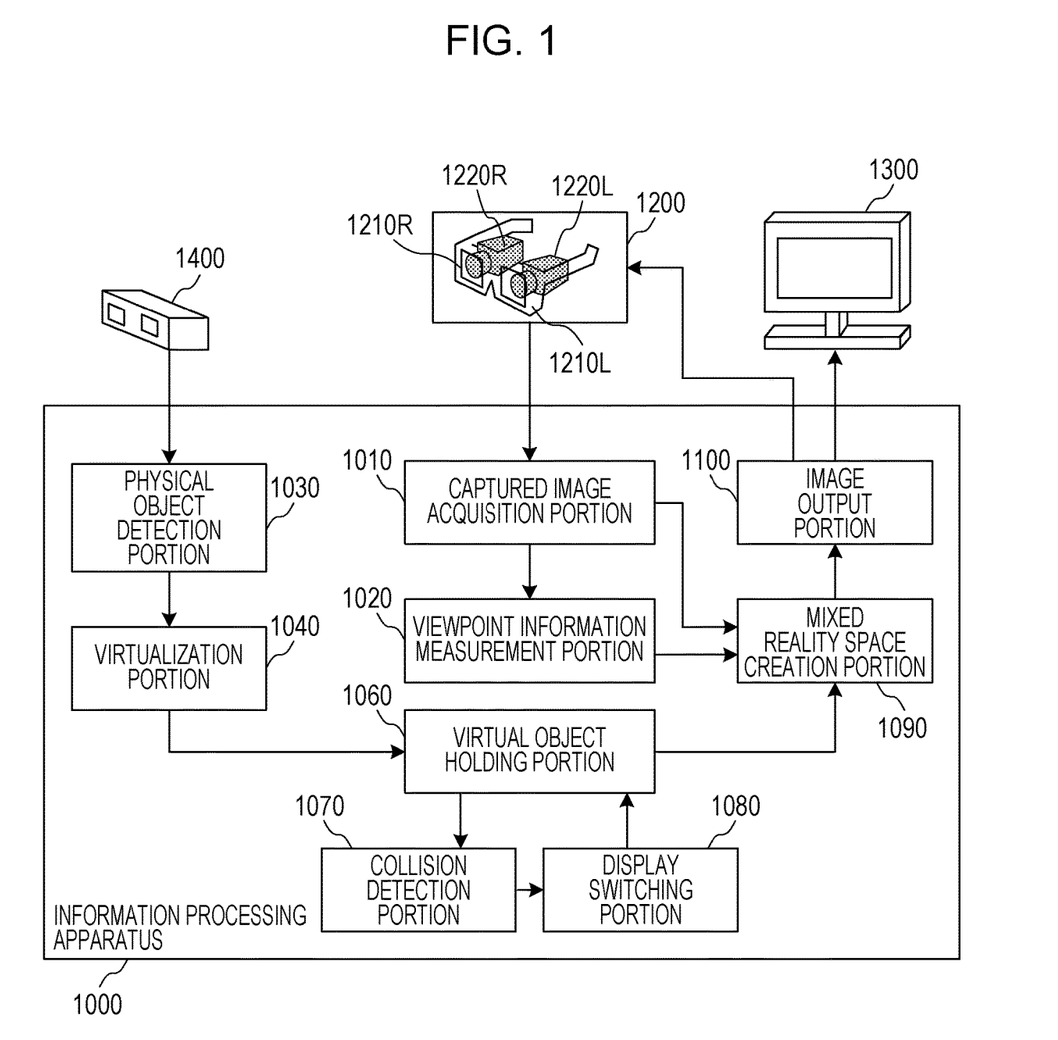
FIG. 1 is a block diagram of an MR system.

FIG. 1 is a block diagram of an MR system including an information processing apparatus according to this embodiment. The MR system includes an information processing apparatus 1000, an HMD 1200 as an example of a head-mounted type display device, a display device 1300, and a physical object information acquisition unit 1400. The information processing apparatus 1000 is wired or wirelessly connected to each of the HMD 1200, the display device 1300, and the physical object information acquisition unit 1400.

The information processing apparatus 1000 detects collision between physical objects or between a physical object and a virtual object in accordance with physical object information (such as a stereo image or a distance image) that is obtained from the physical object information acquisition unit 1400 to detect the physical object in a physical space. In accordance with a result of the detection, the information processing apparatus 1000 creates an image of a mixed reality space (i.e., a mixed reality image) in combination of an image of the physical space (i.e., a physical space image) obtained from the HMD 1200 and an image of a virtual space (i.e., a virtual space image). The information processing apparatus 1000 displays the mixed reality image, created as mentioned above, on at least one of the HMD 1200 and the display device 1300. The physical object information acquisition unit 1400 is constituted by a stereo camera or a distance image camera for obtaining physical object information. The display device 1300 is a general FPD (Flat Panel Display) or CRT (Cathode Ray Tube). When a user is only a person who wears the HMD 1200, the display device 1300 is not needed. The display device 1300 is used when multiple users need to confirm the same mixed reality image as that presented to the person wearing the HMD 1200.

HMD

The HMD 1200 includes an image pickup unit 1210R for a right eye, an image pickup unit 1210L for a left eye, an image display unit 1220R for the right eye, and an image display unit 1220L for the left eye. The image pickup units 1210R and 1210L are image pickup devices for capturing images of the physical space and inputting the captured images, as the physical space images, to the information processing apparatus 1000. In a state in which the user is wearing the HMD 1200 on his or her head, the image pickup unit 1210R is located at a position where it captures an image over a similar range to the visual range of the user's right eye, and the image pickup unit 1210L is located at a position where it captures an image over a similar range to the visual range of the user's left eye. Therefore, the physical space images captured by the image pickup units 1210R and 1210L are stereo images including the visual ranges of the user.

The image display units 1220R and 1220L are each a display device constituted by a liquid crystal screen, etc. In the state in which the user is wearing the HMD 1200 on his or her head, the image display units 1220R and 1220L are arranged on the HMD 1200 such that the image display unit 1220R is positioned in front of the user's right eye and the image display unit 1220L is positioned in front of the user's left eye. Image given with parallaxes are displayed on the image display units 1220R and 1220L. Thus, the HMD 1200 presents a stereo image to the user. The image display units 1220R and 1220L display the mixed reality image created by the information processing apparatus 1000.

As described above, the HMD 1200 in this embodiment is of a video see-through type displaying, on the image display units 1220R and 1220L, the mixed reality image created on the basis of the physical space images captured by the image pickup units 1210R and 1210L. However, the HMD 1200 may be of an optical see-through type displaying a virtual space image in a superimposed manner on a display medium that enables the physical space to be observed with transmission viewing.

Information Processing Apparatus

The information processing apparatus 1000 functions as a captured image acquisition portion 1010 and a viewpoint information measurement portion 1020 in order to execute processing on the physical space images that are obtained from the HMD 1200. The information processing apparatus 1000 further functions as a physical object detection portion 1030, a virtualization portion 1040, a virtual object holding portion 1060, a collision detection portion 1070, and a display switching portion 1080 in order to execute processing on the physical object information that is obtained from the physical object information acquisition unit 1400. Moreover, the information processing apparatus 1000 functions as a mixed reality space creation portion 1090 and an image output portion 1100 in order to display the mixed reality image on at least one of the HMD 1200 and the display device 1300.

The above-described functions may be realized with hardware, but they are realized with software in this embodiment by executing computer programs. To that end, the information processing apparatus 1000 has a hardware configuration illustrated in FIG. 2. The information processing apparatus 1000 includes a CPU (Central Processing Unit) 2010, a ROM (Read Only Memory) 2020, and a RAM (Random Access Memory) 2030. The information processing apparatus 1000 further includes an input interface (I/F) 2040 and an output interface (I/F) 2050. The CPU 2010, the ROM 2020, the RAM 2030, the input I/F 2040, and the output I/F 2050 are interconnected via a bus 2000 in a communicable manner.

Figure 2:
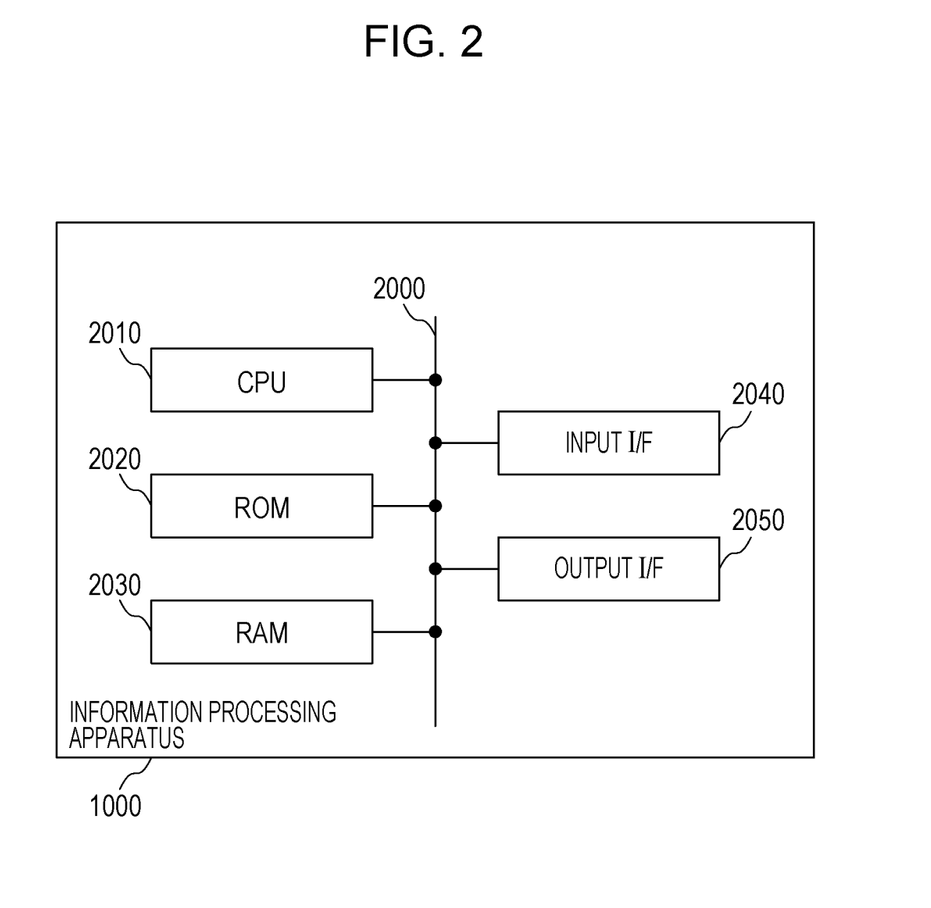
FIG. 2 is a hardware block diagram of an information processing apparatus.

The CPU 2010 controls operation of the information processing apparatus 1000 by executing the computer programs that are read from the ROM 2020, while the RAM 2030 is used as a working area. An operating system (OS), various processing programs related to this embodiment, device drivers, etc. are stored in the ROM 2020 and are executed by the CPU 2010 after being temporarily stored in the RAM 2030. The input I/F 2040 is connected to the HMD 1200 and the physical object information acquisition unit 1400, and it obtains signals representing images, information, etc., which are in formats processable by the information processing apparatus 1000, from the HMD 1200 and the physical object information acquisition unit 1400. The output I/F 2050 is connected to the HMD 1200 and the display device 1300, and it outputs signals representing images that are in formats processable by the HMD 1200 and the display device 1300. The various functions of the information processing apparatus 1000 will be described below.

The captured image acquisition portion 1010 obtains, from the HMD 1200, the physical space images captured by the image pickup units 1210R and 1210L. The captured image acquisition portion 1010 sends the obtained physical space images to the viewpoint information measurement portion 1020 and the mixed reality space creation portion 1090.

The viewpoint information measurement portion 1020 executes image processing of the physical space images obtained from the captured image acquisition portion 1010 and extracts information (feature information) representing features in each image, such as dots, lines, and markers. The viewpoint information measurement portion 1020 measures position-orientation of a viewpoint by making a position in the image of the feature information correspondent to a layout of a space prepared in advance. The viewpoint information measurement portion 1020 sends position-orientation information representing a result of the measurement to the mixed reality space creation portion 1090. The position-orientation information represents a position of the HMD 1200 and a direction in which the HMD 1200 is oriented (i.e., a gaze direction). Thus, the viewpoint information measurement portion 1020 has the function of obtaining the position-orientation information.

While the position-orientation is measured by executing image processing of a visible image in this embodiment, the position-orientation of the physical object may be obtained by using, for example, an image captured with infrared light or a result detected by an ultrasonic or magnetic sensor. Alternatively, the position-orientation of the physical object may be obtained by using a distance image captured with a distance sensor, or may be measured in a mechanical way.

The physical object detection portion 1030 obtains the physical object information from the physical object information acquisition unit 1400. The physical object detection portion 1030 detects the physical object in the physical space from the obtained physical object information and sends a detected result and the physical object information to the virtualization portion 1040.

The virtualization portion 1040 creates a virtual object expressing the physical object in the physical space on the basis of the detected result of the physical object and the physical object information both obtained from the physical object detection portion 1030, thus virtualizing the physical object in the physical space to the virtual object in the virtual space. The virtualization portion 1040 makes control to hold information about a shape of the created virtual object, position-orientation thereof in the virtual space, etc. in the virtual object holding portion 1060. The virtualization of the physical object in the physical space to the virtual object in the physical space can be performed by using KinectFusion (registered trademark) available from Surreal Vision Ltd., for example. KinectFusion implies real-time three-dimensional reconstruction using Kinect (registered trademark). When the virtualization to the virtual object is performed by using KinectFusion, a distance image camera is used as the physical object information acquisition unit 1400. The virtualization portion 1040 first produces a group of dots on a physical object surface from a distance image that is obtained as the physical object information from the distance image camera. Then, the virtualization portion 1040 performs the three-dimensional reconstruction through steps of estimating position-orientation of the camera based on ICP (Iterative Closest Point), creating a three-dimensional object, and executing rendering. The virtualization portion 1040 may perform the virtualization of the physical space to the virtual object (i.e., the creation of the virtual object) by a method other than KinectFusion.

The virtual object holding portion 1060 holds information about the virtual object constituting the virtual space (such as the shape of the virtual object and the position-orientation thereof in the virtual space), information about a light source illuminating the virtual space (such as the position-orientation of the light source), and information about the virtual space. The virtual object holding portion 1060 further holds not only information about the virtual object created by the virtualization portion 1040, but also information about a virtual object created with execution of a computer program. Moreover, the virtual object holding portion 1060 holds information about multiple virtual objects that are created from multiple physical objects by the virtualization portion 1040. Those various types of information held in the virtual object holding portion 1060 are read by the collision detection portion 1070 and the mixed reality space creation portion 1090.

The collision detection portion 1070 detects collision between the virtual objects and sends a result of the detection to the display switching portion 1080. Because a technique of detecting the collision between the virtual objects is known, description of the technique is omitted.

The display switching portion 1080 determines a display state of the virtual object, which has been virtualized from the physical object information, in accordance with the result of detecting the collision between the virtual objects. When the virtual object virtualized from the physical object information collides with another virtual object, the display switching portion 1080 sets the relevant virtual object to be displayed (visualized). When both the objects do not collide with each other, the display switching portion 1080 sets the relevant virtual object to be not displayed (visualized). The display switching portion 1080 makes control to hold, in the virtual object holding portion 1060, information representing the display state of the virtual object in link with the information about the virtual object. While it is assumed in this embodiment to display the virtual object in single color, the virtual object may be visualized, for example, by displaying it as a wireframe, in a blinking manner, in a translucent form, or with gradations depending on distances from a collision position.

The mixed reality space creation portion 1090 creates a virtual space image on the basis of both the virtual object held in the virtual object holding portion 1060 and the viewpoint position-orientation information given as the result of the measurement by the viewpoint information measurement portion 1020. The virtual space image created here is an image obtained when the virtual space including the virtual object held in the virtual object holding portion 1060 is viewed from the position-orientation of the HMD 1200, which is represented by the position-orientation information. In other words, the virtual space image is given as an image captured under conditions of the same orientation and range as those of the physical space image. The mixed reality space creation portion 1090 executes creation of an image of the mixed reality space (i.e., creation of the mixed reality image) by superimposing the physical space image obtained from the captured image acquisition portion 1010 on the created virtual space image. The mixed reality space creation portion 1090 sends the created mixed reality image to the image output portion 1100. Because a technique of creating a virtual space obtained when viewing the virtual object from a predetermined position represented by the position-orientation information is known, detailed description of the technique is omitted.

The image output portion 1100 sends the mixed reality image obtained from the mixed reality space creation portion 1090 to at least one of the HMD 1200 and the display device 1300. The HMD 1200 displays the mixed reality image obtained from the image output portion 1100 by the image display units 1220R and 1220L. The display device 1300 also displays the mixed reality image obtained from the image output portion 1100.

Processing

Figure 3:
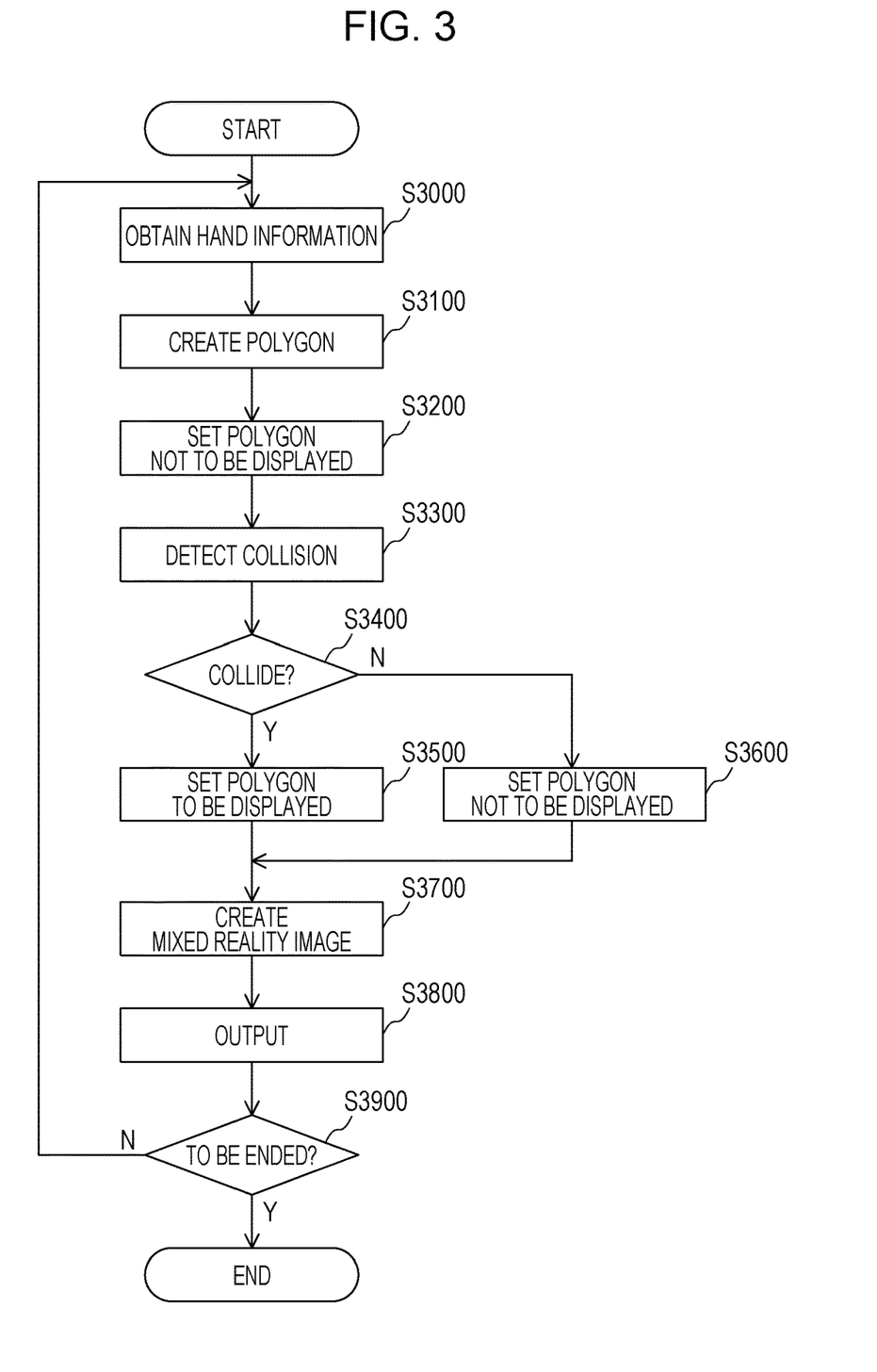
FIG. 3 is a flowchart representing image processing.

FIG. 3 is a flowchart representing image processing that includes the physical-object collision detection in the MR system described above. In the image processing, the mixed reality image is created and displayed. Here, the physical object is assumed to be a user's hand, for example, and whether the hand collides with the virtual object is detected. As a matter of course, the physical object is not limited to the hand.

In the information processing apparatus 1000, the physical object detection portion 1030 obtains the physical object information about the user's hand from the physical object information acquisition unit 1400 (S3000). The virtualization portion 1040 obtains the physical object information about the hand from the physical object detection portion 1030 and creates a virtual object (polygon) of the hand from the physical object information (S3100). The hand in the physical space is thereby virtualized to a virtual object. The hand polygon is held in the virtual object holding portion 1060. The display switching portion 1080 sets the hand polygon held in the virtual object holding portion 1060 to be not displayed (S3200).

The collision detection portion 1070 detects whether the hand polygon held in the virtual object holding portion 1060 collides with another virtual object (S3300). If a detection result shows that the hand polygon collides with another virtual object (S3400: Y), the display switching portion 1080 sets the hand polygon to be displayed (S3500). If the detected result shows that the hand polygon does not collide with another virtual object (S3400: N), the display switching portion 1080 sets the hand polygon to be not displayed (S3600).

The mixed reality space creation portion 1090 creates the mixed reality image on the basis of the virtual object held in the virtual object holding portion 1060, the position-orientation information that is the result of the measurement by the viewpoint information measurement portion 1020, and the physical space image obtained from the captured image acquisition portion 1010 (S3700). The image output portion 1100 outputs the created mixed reality image to the HMD 1200 (S3800). The information processing apparatus 1000 determines whether the processing is to be ended after outputting the mixed reality image (S3900). If the processing is not to be ended (S3900: N), the information processing apparatus 1000 repeatedly executes the processing in S3000 and the subsequent steps. If the processing is to be ended (S3900: Y), the information processing apparatus 1000 ends the processing at once.

With the above-described information processing apparatus 1000 according to this embodiment, the physical object is virtualized, and an image of the virtualized physical object is visualized only when the virtualized physical object collides with another virtual object. Therefore, the collision between the physical object and the virtual object can be presented to the user without disturbing the image in the real world, which is captured by the HMD 1200. Furthermore, when the other virtual object is also an image of a virtualized physical object, collision between the physical objects can be presented to the user.

Figure 4:
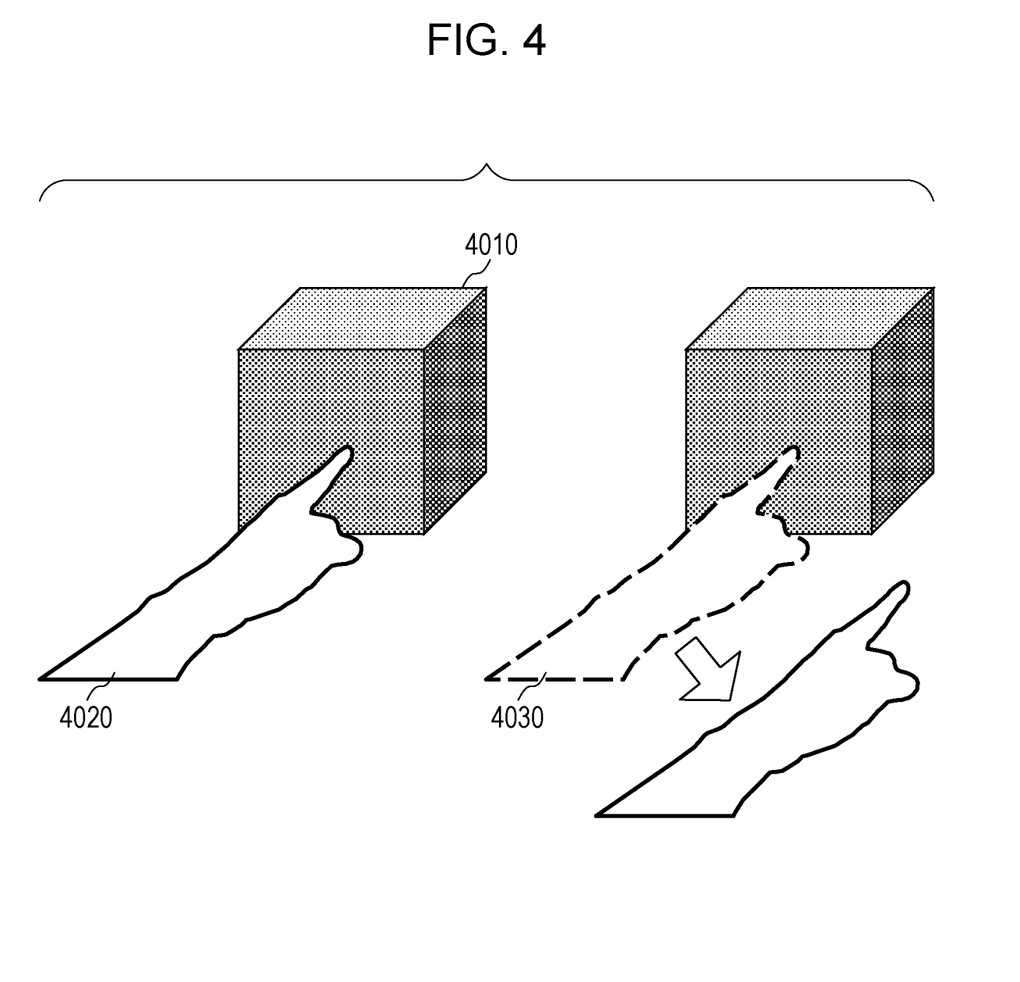
FIG. 4 is an explanatory view illustrating the case in which a hand as a physical object collides with a virtual object.

The virtual object having been visualized because of collision with another virtual object may be continuously visualized even after the collision state has been cleared. In such a case, control may be performed such that a relative position of the relevant virtual object to the other virtual object in collision with the former is kept unchanged from the position at a time when the collision has occurred. This can be realized by holding the relative position at the time when the collision has occurred, and by drawing a virtual object to be located at the relative position with respect to the other virtual object as a reference. FIG. 4 is an explanatory view illustrating the case in which a hand as a physical object collides with a virtual object. The hand 4020 as the physical object is virtualized to a virtual object.

When another virtual object 4010 and the virtual object of the hand 4020 do not collide with each other, a virtualized hand 4030 is not displayed, and the user can view only the hand 4020 as the physical object. When the other virtual object 4010 and the virtual object of the hand 4020 collide with each other, the virtualized hand 4030 is visualized and displayed. At that time, a relative position of the virtualized hand 4030 to the other virtual object 4010 is fixed to a constant position.

Since the relative position of the virtualized hand 4030 to the other virtual object 4010 is fixed to the constant position in the state in which the virtualized hand 4030 is visualized, a collision condition between the physical object and the virtual object (i.e., how both the objects collide with each other) can be presented to the user.

In the above description, the image processing including the physical-object collision detection is executed by one unit of the information processing apparatus 1000. However, the image processing including the physical-object collision detection may be executed by a system including multiple units of the information processing apparatus 1000. In other words, each of the multiple information processing apparatuses may execute the collision detection. Collision detection results of the individual information processing apparatuses may be collected into any one of the information processing apparatuses, and the one information processing apparatus may determine, with comprehensive judgment based on those collision detection results, whether the virtualized physical object is to be visualized. A manner of expressing the virtual object may be changed depending on the collision detection results of the individual information processing apparatuses. For example, a luminance, a color, a contour, etc. of the virtual object may be changed depending on a collision time and a collision area, for example.

The present invention can also be implemented with a process of supplying one or more programs for realizing one or more of the functions of the above-described embodiment to a system or a device via a network or a storage medium, and causing one or more processors in the system or the device to read the one or more programs and to execute the read program(s). Alternatively, the present invention can be further implemented by a circuit (e.g., ASIC) realizing the one or more functions.

Any of the above-described embodiments represents a practical example in implementing the present invention, and the technical scope of the present invention is not to be construed in a restrictive sense by the above-described embodiments. In other words, the present invention can be implemented in various forms without departing from the technical scope or the main features of the present invention.

According to the present invention, the collision between the physical objects or between the physical object and the virtual object can be presented to a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
   one or more processors; and
   one or more memories coupled to the one or more processors, the one or more memories having stored thereon instructions which, when executed by the one or more processors, cause the apparatus to:
   obtain, from an image pickup device, a physical space image that is an image of a physical space captured by the image pickup device;
   obtain position and orientation information that represents a position and an orientation of a viewpoint of the image pickup device;
   detect a physical object in the physical space;
   create a first virtual object that expresses a three dimensional structure of the detected physical object;
   set a display state of the first virtual object to an invisible state in a case where the first virtual object and a second virtual object do not collide;
   detect collision between the first virtual object and the second virtual object;
   change an appearance of the first virtual object so as to inform a user of the collision between the detected physical object and the second virtual object by switching the display state of the first virtual object from the invisible state to a visible state in response to the detection of the collision;
   create, based on a virtual space including the first virtual object and the second virtual object, the position and orientation information, the display state, and the physical space image, a mixed reality image in combination of an image of the virtual space and the physical space image; and
   output the created mixed reality image to be displayed on a display device,
   wherein the mixed reality image is created so that a relative position at the time of the collision between the first virtual object in the visible state and the second virtual object is maintained even when the detected physical object corresponding to the first virtual object is separated from the second virtual object after the collision.

2. The information processing apparatus according to claim 1, wherein in the displayed state, the first virtual object is displayed as a wireframe, in a blinking manner, or in a translucent form when the first virtual object and the second virtual object collide with each other.

3. The information processing apparatus according to claim 1, wherein in the displayed state, the first virtual object is displayed with gradations depending on distances from a collision position when the first virtual object and the second virtual object collide with each other.

4. The information processing apparatus according to claim 3, wherein the second virtual object is obtained by creating a virtual object that expresses another physical object.

5. The information processing apparatus according to claim 4, wherein from measurement device measuring the position and orientation of the viewpoint of the image pickup device, the position and orientation information that represents the position and orientation of the viewpoint of the image pickup device is created.

6. The information processing apparatus according to claim 5, wherein the measurement device measures the position and orientation of the viewpoint of the image pickup device based on features detected from an image picked up by the image pickup device.

7. A system comprising a plurality of the information processing apparatuses according to claim 1,
wherein each of the plurality of the information processing apparatuses detects the collision between the first virtual object and the second virtual object;
any one of the information processing apparatuses determines a display state of the first virtual object with comprehensive judgment based on collision detection results in the individual information processing apparatuses.

8. The system according to claim 7, wherein the any one of the information processing apparatuses changes a manner of expressing the first virtual object in accordance with the collision detection results in the individual information processing apparatuses.

9. An image processing method executed by an information processing apparatus connected to an image pickup device capturing a physical space image that is an image of a physical space, and to a display device, the image processing method comprising steps of:
obtaining position and orientation information that represents a position and an orientation of a viewpoint of the image pickup device;
detecting a physical object in the physical space;
creating a first virtual object that expresses a three dimensional structure of the detected physical object;
set a display state of the first virtual object to an invisible state in a case where the first virtual object and a second virtual object do not collide;
detecting collision between the first virtual object and the second virtual object;
change an appearance of the first virtual object so as to informing a user of the collision between the detected physical object and the second virtual object by switching the display state of the first virtual object from the invisible state to a visible state in response to the detection of the collision; and
creating, based on a virtual space including the first virtual object and the second virtual object, the position and orientation information, the display state, and the physical space image, a mixed reality image in combination of an image of the virtual space and the physical space image; and
outputting the created mixed reality image to be displayed on the display device,
wherein the mixed reality image is created so that a relative position at the time of the collision between the first virtual object in the visible state and the second virtual object is maintained even when the detected physical object corresponding to the first virtual object is separated from the second virtual object after the collision.

10. A non-transitory storage medium storing a computer program for a computer connected to an image pickup device capturing a physical space image that is an image of a physical space, and to a display device, the program causing the computer to execute steps of:
obtaining position and orientation information that represents a position and an orientation of a viewpoint of the image pickup device;
detecting a physical object in the physical space;
creating a first virtual object that expresses a three dimensional structure of the detected physical object;
set a display state of the first virtual object to an invisible state in a case where the first virtual object and a second virtual object do not collide;
detecting collision between the first virtual object and the second virtual object;
change an appearance of the first virtual object so as to informing a user of the collision between the detected physical object and the second virtual object by switching the display state of the first virtual object from the invisible state to a visible state in response to the detection of the collision; and
creating, based on a virtual space including the first virtual object and the second virtual object, the position and orientation information, the display state, and the physical space image, a mixed reality image in combination of an image of the virtual space and the physical space image; and
outputting the created mixed reality image to be displayed on the display device,
wherein the mixed reality image is created so that a relative position at the time of the collision between the first virtual object in the visible state and the second virtual object is maintained even when the detected physical object corresponding to the first virtual object is separated from the second virtual object after the collision.

* * * * *